United States Patent
Nakaoka et al.

(10) Patent No.: US 9,928,030 B2
(45) Date of Patent: Mar. 27, 2018

(54) SPEECH RETRIEVAL DEVICE, SPEECH RETRIEVAL METHOD, AND DISPLAY DEVICE

(71) Applicant: Panasonic Intellectual Property Management Co., Ltd., Osaka (JP)

(72) Inventors: Hideaki Nakaoka, Osaka (JP); Tomohiro Koganei, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/110,733

(22) PCT Filed: Mar. 9, 2015

(86) PCT No.: PCT/JP2015/001257
§ 371 (c)(1),
(2) Date: Jul. 9, 2016

(87) PCT Pub. No.: WO2015/146017
PCT Pub. Date: Oct. 1, 2015

(65) Prior Publication Data
US 2016/0328206 A1    Nov. 10, 2016

(30) Foreign Application Priority Data

Mar. 28, 2014    (JP) ................. 2014-068183

(51) Int. Cl.
*G10L 15/20*    (2006.01)
*G10L 17/00*    (2013.01)
(Continued)

(52) U.S. Cl.
CPC ............... *G06F 3/167* (2013.01); *G06F 3/16* (2013.01); *G06F 17/30* (2013.01);
(Continued)

(58) Field of Classification Search
CPC ......... G10L 15/20; G10L 17/00; G06F 17/30; G06F 3/16
(Continued)

(56) References Cited

U.S. PATENT DOCUMENTS 6,192,343 B1    2/2001    Morgan et al.
6,937,984 B1    8/2005    Morgan et al.
(Continued)

FOREIGN PATENT DOCUMENTS

EP    1154611    11/2001
JP    2001-075968    3/2001
(Continued)

OTHER PUBLICATIONS

Eligrey/voice search option (https://raw.githubusercontent.com/eligrey/voice-search/master/screenshots/options.png, Published Oct. 9, 2013).*

(Continued)

*Primary Examiner* — Seong Ah A Shin
(74) *Attorney, Agent, or Firm* — McDermott Will & Emery LLP

(57) ABSTRACT

A voice search apparatus includes a web page display controller, a voice recognizer, a matching unit, and a URL creator. The web page display controller controls a web page which is to be displayed on a display. The voice recognizer recognizes a voice that is input, converts the voice into character string information, and outputs the character string information. The matching unit refers to a URL list in which a character string representing part of a URL is registered for each search category, performs matching processing between a URL of the web page displayed on the display and the character string in the URL list, and specifies the character string in the URL list corresponding to the URL. The URL creator creates a URL based on the character string (Continued)

specified by the matching unit and the character string information.

3 Claims, 9 Drawing Sheets

(51) Int. Cl.
*G06F 17/30* (2006.01)
*G06F 3/16* (2006.01)
*G10L 15/22* (2006.01)
*G10L 15/26* (2006.01)
*G10L 13/00* (2006.01)

(52) U.S. Cl.
CPC ........ *G06F 17/30887* (2013.01); *G10L 13/00* (2013.01); *G10L 15/22* (2013.01); *G10L 15/26* (2013.01)

(58) Field of Classification Search
USPC .................. 704/246, 235, 275; 715/728, 777
See application file for complete search history.

(56) References Cited

U.S. PATENT DOCUMENTS

| | | | |
|---|---|---|---|
| 7,058,626 B1* | 6/2006 | Pan | G06F 17/30669 |
| 7,206,747 B1 | 4/2007 | Morgan et al. | |
| 8,275,617 B1 | 9/2012 | Morgan et al. | |
| 8,751,240 B2* | 6/2014 | Lewis | G10L 15/1822 379/88.01 |
| 9,633,674 B2* | 4/2017 | Sinha | G10L 25/00 |
| 9,646,606 B2* | 5/2017 | Peng | G10L 15/08 |
| 2002/0065842 A1 | 5/2002 | Takagi et al. | |
| 2002/0194004 A1* | 12/2002 | Glinski | G06F 17/30666 704/270.1 |
| 2007/0005570 A1* | 1/2007 | Hurst-Hiller | G06F 17/30654 |
| 2009/0276398 A1 | 11/2009 | Naganuma et al. | |
| 2011/0307253 A1* | 12/2011 | Lloyd | G10L 15/20 704/233 |
| 2012/0278719 A1* | 11/2012 | Hwang | G10L 15/22 715/728 |
| 2013/0041670 A1 | 2/2013 | Morgan et al. | |
| 2014/0372119 A1* | 12/2014 | Parada | G06F 17/30899 704/246 |
| 2015/0169154 A1* | 6/2015 | Ainslie | G06F 17/30887 715/777 |

FOREIGN PATENT DOCUMENTS

| | | |
|---|---|---|
| JP | 2001-134580 | 5/2001 |
| JP | 2002-055872 | 2/2002 |
| JP | 3292190 B | 6/2002 |
| JP | 2006-285855 | 10/2006 |
| JP | 2009-009170 | 1/2009 |

OTHER PUBLICATIONS

Eligrey (https://github.com/eligrey/voice-search, Published Oct. 9, 2013).*
Google_youtube, "Talk to Google on Chrome", https://www.youtube.com/watch?v=oNBBijn4JuY, Published on Nov. 26, 2013.*
"Google Adds Hands-Free Voice Search to Chrome (Just Say "OK Google")" by Melanie Pinola (http://lifehacker.com/google-adds-hands-free-voice-search-to-chrome-just-say-1472669127, published Nov. 27, 2013).*
"How to Use Voice Search and Google Now in Chrome on Your Desktop" by Chris Hoffman (http://www.howtogeek.com/189048/howtousevoicesearchandgooglenowinchromeonyourdesktop/, Published May 12, 2014).*
International Search Report of PCT application No. PCT/JP2015/001257 dated May 19, 2015.
The Extended European Search Report dated Jan. 30, 2017 for the related European Patent Application No. 15769934.9.
Communication pursuant to Article 94(3) EPC dated Nov. 22, 2017 for the related European Patent Application No. 15769934.9.
Eli Grey: "Voice Search", Github, Oct. 9, 2013 (Oct. 9, 2013), pp. 1-3, XP055425100, Retrieved from the Internet: URL:https://github.com/eligrey/voice-search/blob/master/README.md [retrieved on Nov. 15, 2017].

* cited by examiner

FIG. 4

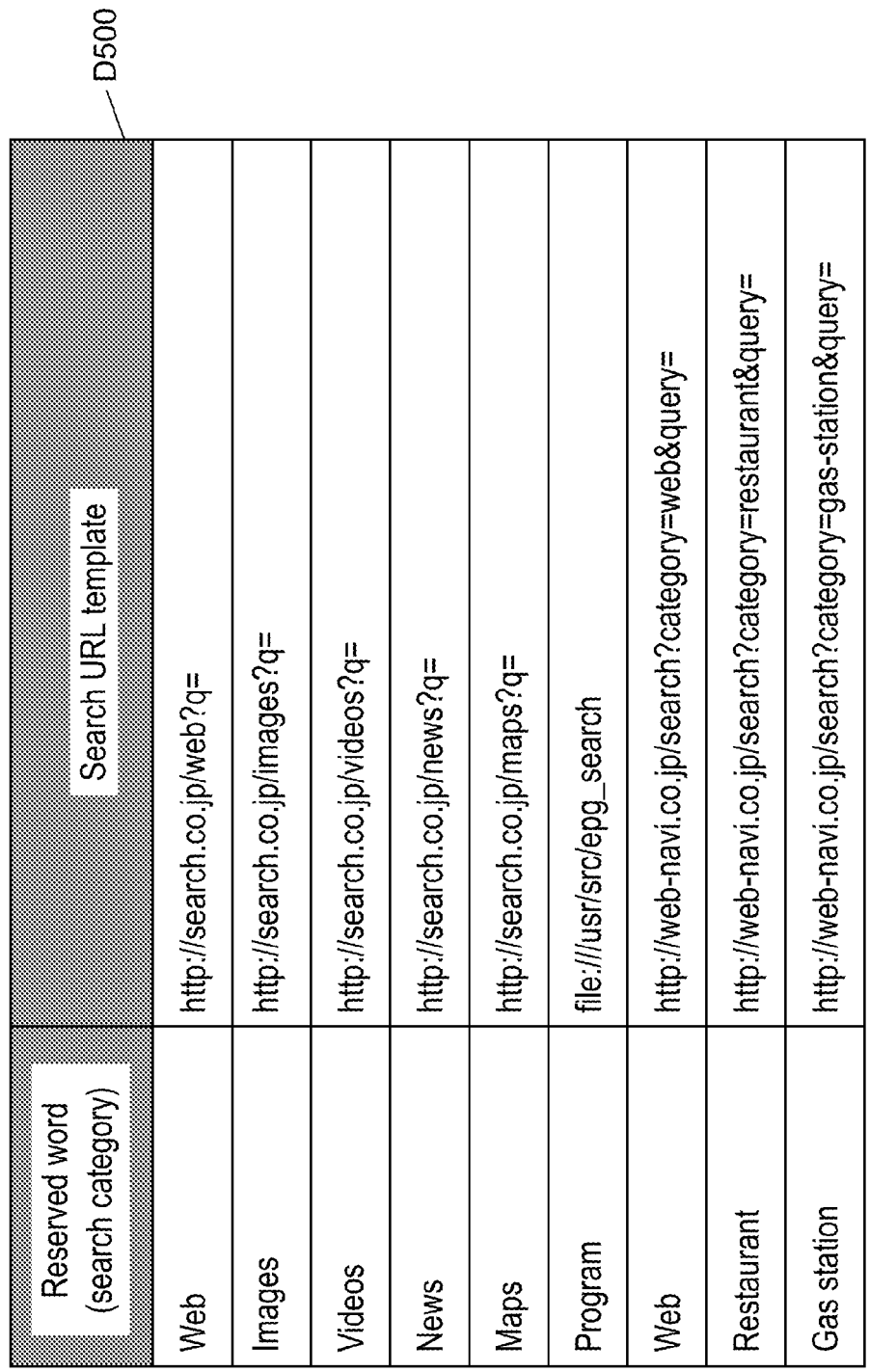

| Reserved word (search category) | Search URL template |
|---|---|
| Web | http://search.co.jp/web?q= |
| Images | http://search.co.jp/images?q= |
| Videos | http://search.co.jp/videos?q= |
| News | http://search.co.jp/news?q= |
| Maps | http://search.co.jp/maps?q= |
| Program | file:///usr/src/epg_search |
| Web | http://web-navi.co.jp/search?category=web&query= |
| Restaurant | http://web-navi.co.jp/search?category=restaurant&query= |
| Gas station | http://web-navi.co.jp/search?category=gas-station&query= |

D500

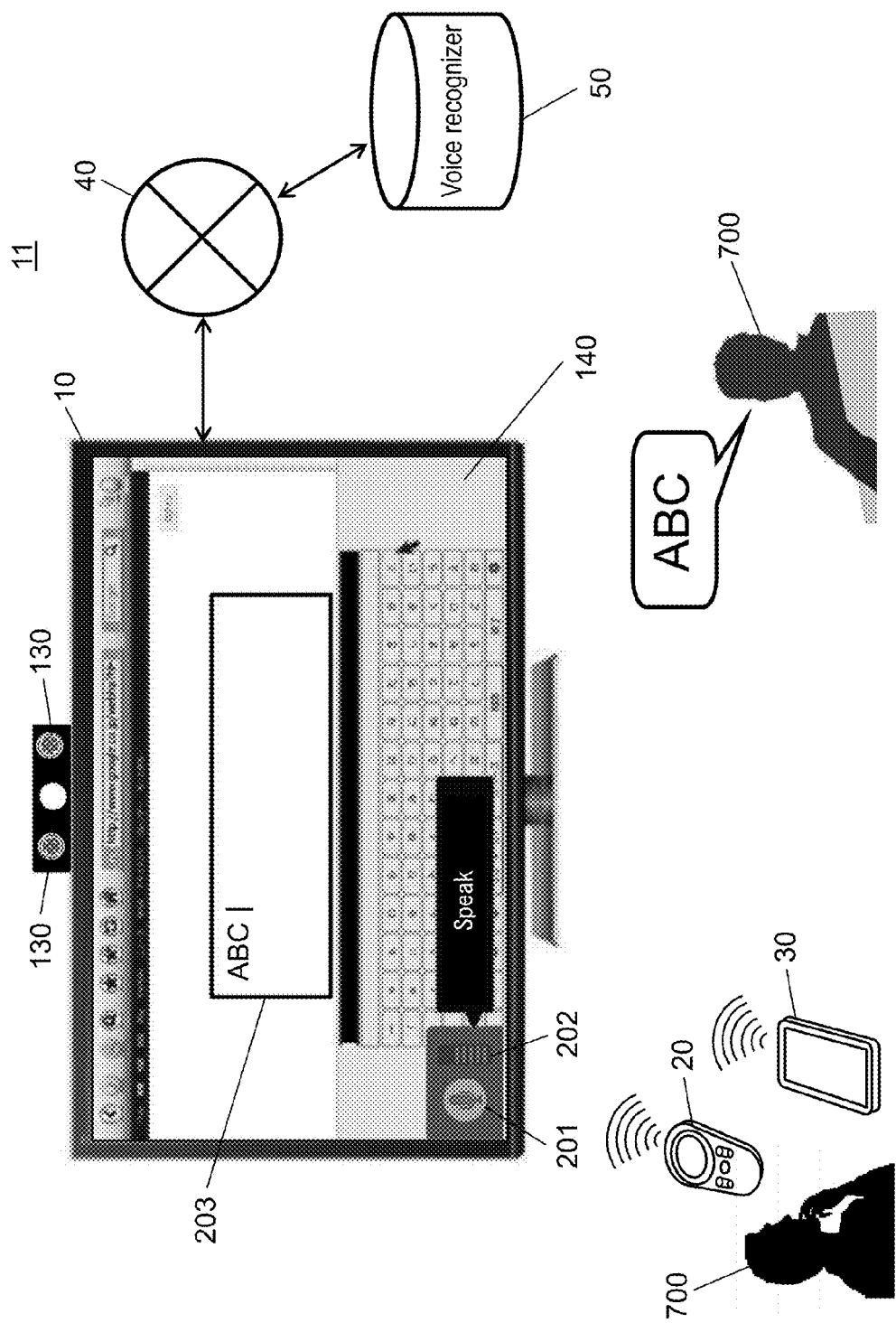

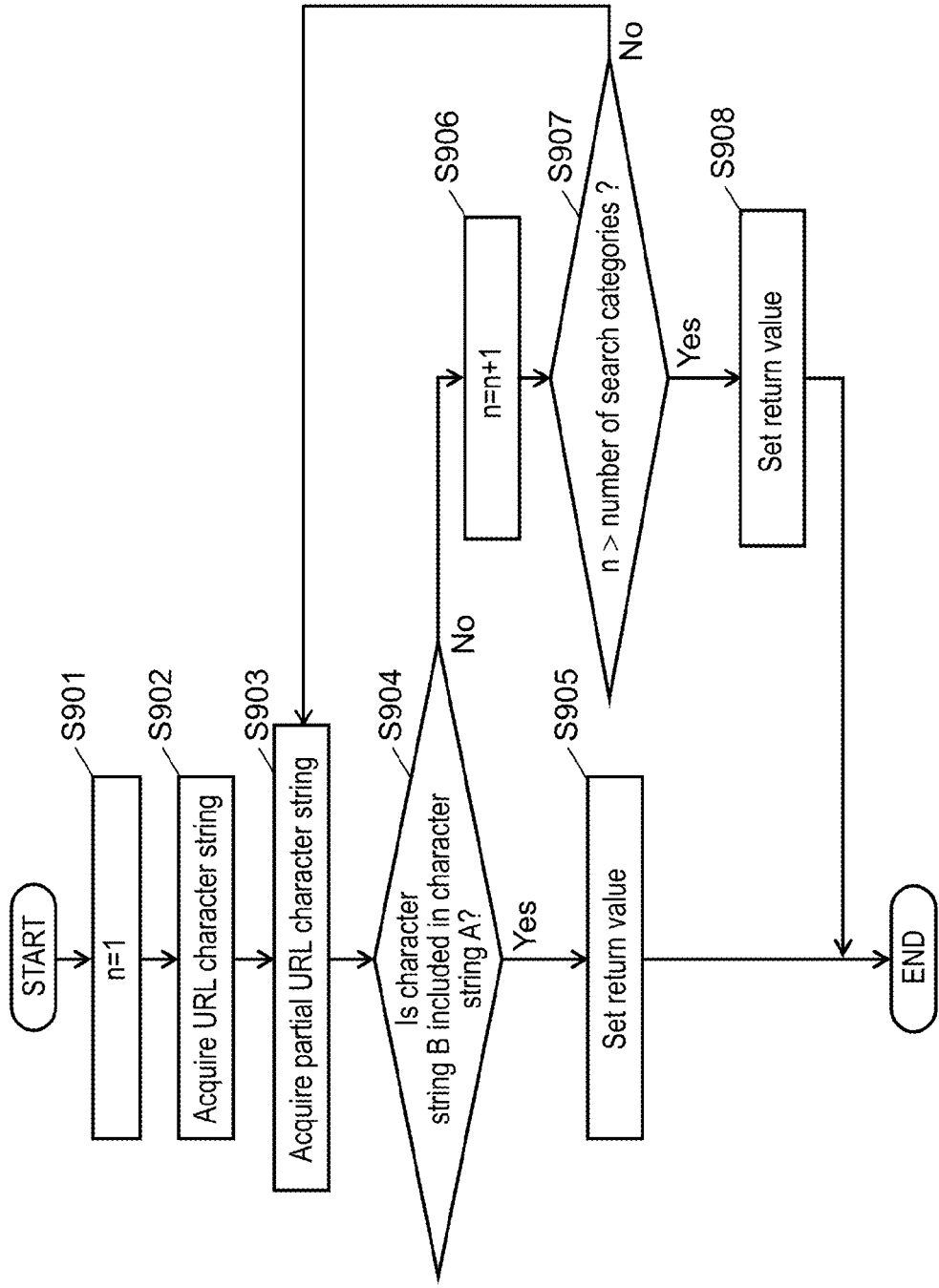

SPEECH RETRIEVAL DEVICE, SPEECH RETRIEVAL METHOD, AND DISPLAY DEVICE

TECHNICAL FIELD

The present disclosure relates to voice search apparatuses, voice search methods, and display apparatuses that operate by recognizing a voice uttered by a user.

BACKGROUND ART

Patent Literature 1 discloses a voice input apparatus that has a voice recognition function. This voice input apparatus is configured to receive a voice uttered by a user, to recognize an instruction indicated by the voice of the user (hereinafter referred to as "voice recognition") by analyzing the received voice, and to control a device in response to the voice-recognized instruction. That is, the voice input apparatus of Patent Literature 1 is capable of performing voice recognition on the voice arbitrarily uttered by the user, and controlling the device in response to the instruction that is a result of the voice recognition (hereinafter referred to as "command"). Hereinafter, an operation of the device using the voice recognition function is referred to as "voice operation".

The user who uses this voice input apparatus may perform a search on a web site that provides a search service on the Internet (hereinafter referred to as a "search site"), for example, while operating a device such as a television receiver (hereinafter referred to as "television") and PC (Personal Computer) by using this voice recognition function of the voice input apparatus. Hereinafter, the search by the voice operation is referred to as "voice search". Data to be searched at this time is classified, for example, into a plurality of categories such as web pages, images, and maps. The user may also use this voice recognition function of the voice input apparatus to search data that belongs to a category different from the above categories, such as program guide data and recorded videos retained in the television.

Patent Literature 2 discloses an information search method for performing information search using a table (correspondence table) that associates keywords with categories. In case that a voice uttered by the user can be classified into either of the categories registered in the table, this information search method allows voice recognition of the voice uttered by the user, and allows a search of the category by using the keyword included in a character string resulting from the voice recognition.

For example, when performing a voice search of the category of "images" for an image of "ABC", the user who uses the information search method described in Patent Literature 2 may utter "Search images for ABC". This causes a search site to search the category of "images" for "ABC". When searching for an image of "XYZ" continuously, the user may utter, for example, "Search images for XYZ".

CITATION LIST

Patent Literature

PTL 1: Japanese patent No. 3292190
PTL 2: Unexamined Japanese Patent Publication No. 2001-75968

SUMMARY

The present disclosure provides a voice search apparatus and voice search method for improving user operativity.

The voice search apparatus according to the present disclosure includes a web page display controller, a voice recognizer, a matching unit, and a URL creator. The web page display controller controls a web page which is to be displayed on a display. The voice recognizer recognizes a voice that is input, converts the voice into character string information, and outputs the character string information. The matching unit refers to a URL list in which a character string representing part of a URL is registered for each search category, performs matching processing between a URL of the web page displayed on the display and the character string in the URL list, and specifies the character string in the URL list corresponding to the URL. The URL creator creates a URL based on the character string specified by the matching unit and the character string information.

The voice search method according to the present disclosure includes: displaying a web page on a display; recognizing a voice that is input and converting the voice into character string information; referring to a URL list in which a character string representing part of a URL is registered for each search category, performing matching processing between a URL of the web page displayed on the display and the character string in the URL list, and specifying the character string in the URL list corresponding to the URL; and creating a URL based on the specified character string and the character string information.

A display apparatus according to the present disclosure includes a display, a web page display controller, a voice recognizer, a matching unit, and a URL creator. The web page display controller controls a web page which is to be displayed on a display. The voice recognizer recognizes a voice that is input, converts the voice into character string information, and outputs the character string information. The matching unit refers to a URL list in which a character string representing part of a URL is registered for each search category, performs matching processing between a URL of the web page displayed on the display and the character string in the URL list, and specifies the character string in the URL list corresponding to the URL. The URL creator creates a URL based on the character string specified by the matching unit and the character string information.

The voice search apparatus according to the present disclosure may improve operativity when the user performs a voice operation.

BRIEF DESCRIPTION OF DRAWINGS

FIG. 4 is a diagram schematically illustrating an example of a search URL list stored in the storage of the voice recognition apparatus according to the first exemplary embodiment.

FIG. 5 is a diagram illustrating an outline of dictation to be performed by the voice recognition system according to the first exemplary embodiment.

FIG. 9 is a flow chart illustrating an operation example of search category determination processing to be performed by the voice recognition system according to the first exemplary embodiment.

DESCRIPTION OF EMBODIMENTS

Exemplary embodiments will be described in detail below with reference to the drawings as necessary. However, a description that is more detailed than necessary may be omitted. For example, a detailed description of an already well-known item and a repeated description of substantially identical components may be omitted. This is intended to avoid the following description from becoming unnecessarily redundant and to make the description easier for a person skilled in the art to understand.

Note that the accompanying drawings and the following description are provided in order for a person skilled in the art to fully understand the present disclosure, and are not intended to limit the subject described in the appended claims.

First Exemplary Embodiment

A first exemplary embodiment will be described below with reference to FIG. 1 to FIG. 9. Note that although television receiver (television) 10 is cited in the present exemplary embodiment as an example of a display apparatus including a voice search apparatus, the display apparatus is not limited to television 10. For example, the display apparatus may be an apparatus such as a PC and a tablet terminal.

[1-1. Configuration]

Figure 1:
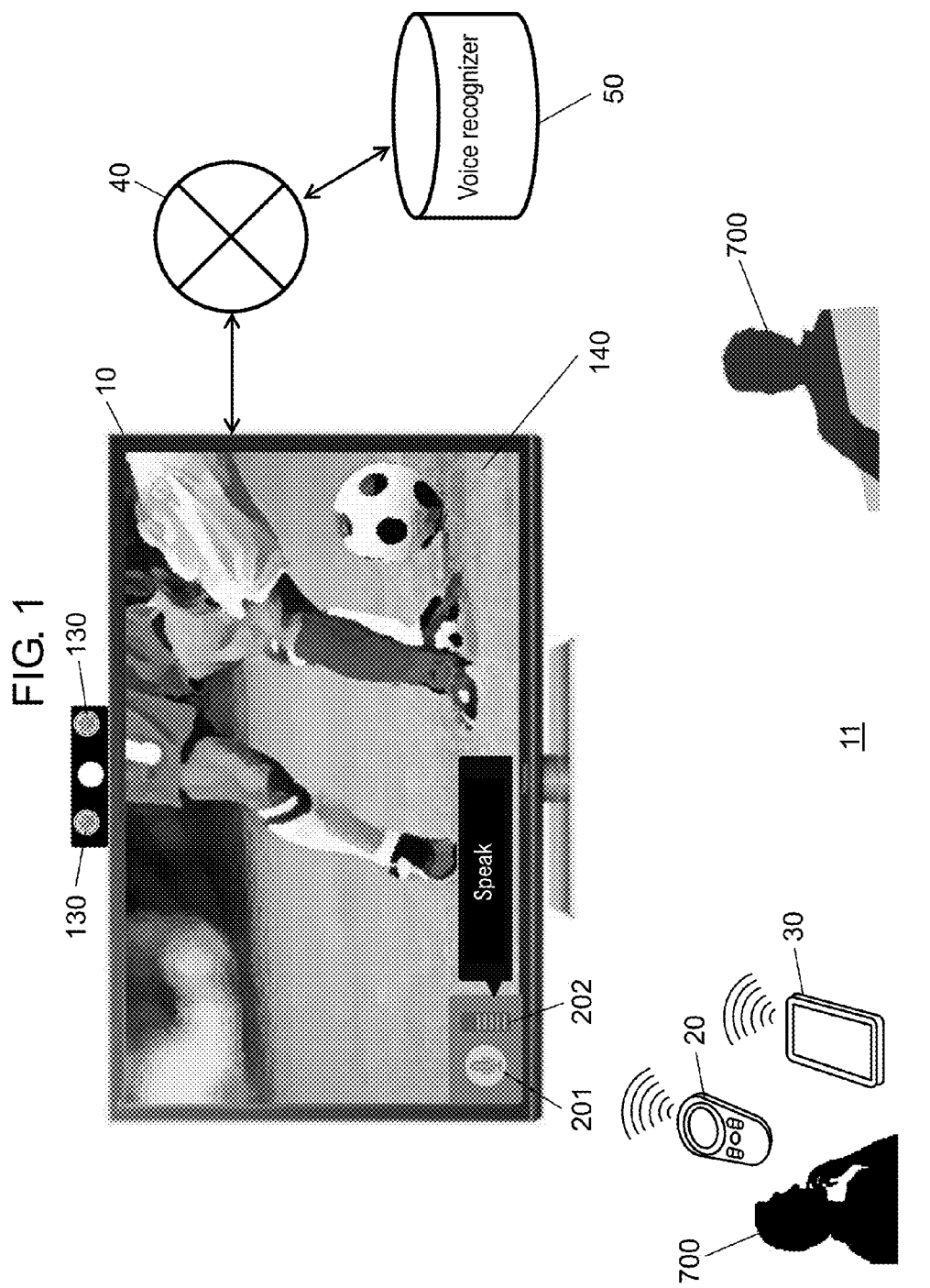
FIG. 1 is a diagram schematically illustrating a voice recognition system according to a first exemplary embodiment.

FIG. 1 is a diagram schematically illustrating voice recognition system 11 according to the first exemplary embodiment. In the present exemplary embodiment, the voice search apparatus is incorporated in television 10, which is an example of the display apparatus. The voice recognition apparatus included in the voice search apparatus incorporated in television 10 recognizes a voice uttered by a user, and controls television 10 in accordance with a result of the voice recognition.

As illustrated in FIG. 1, voice recognition system 11 according to the present exemplary embodiment includes television 10 and voice recognizer 50. In addition, voice recognition system 11 may also include at least one of remote controller (hereinafter also referred to as "remocon") 20 and mobile terminal 30.

When the voice recognition apparatus starts in television 10, voice recognition icon 201 and indicator 202 indicating volume of a collected voice are displayed on display 140 of television 10, together with a video based on a signal such as an input video signal and a received broadcast signal. This is for indicating user 700 that an operation of television 10 based on a voice of user 700 (voice operation) is available and for prompting user 700 to utter a voice.

When user 700 utters a voice toward remote controller 20 or mobile terminal 30, the voice will be collected by a microphone incorporated in remote controller 20 or in mobile terminal 30, and will be transferred to television 10. Then, the voice uttered by user 700 undergoes voice recognition by the voice recognition apparatus incorporated in television 10. In television 10, control of television 10 is performed in accordance with the result of the voice recognition.

Television 10 may include microphone 130. In this case, when user 700 utters a voice toward microphone 130 included in television 10, the voice will be collected by microphone 130 and undergo voice recognition by the voice recognition apparatus. Therefore, it is also possible to configure voice recognition system 11 to include neither remote controller 20 nor mobile terminal 30.

Also, television 10 is connected to voice recognizer 50 via network 40. Television 10 may communicate with voice recognizer 50 via network 40.

Figure 2:
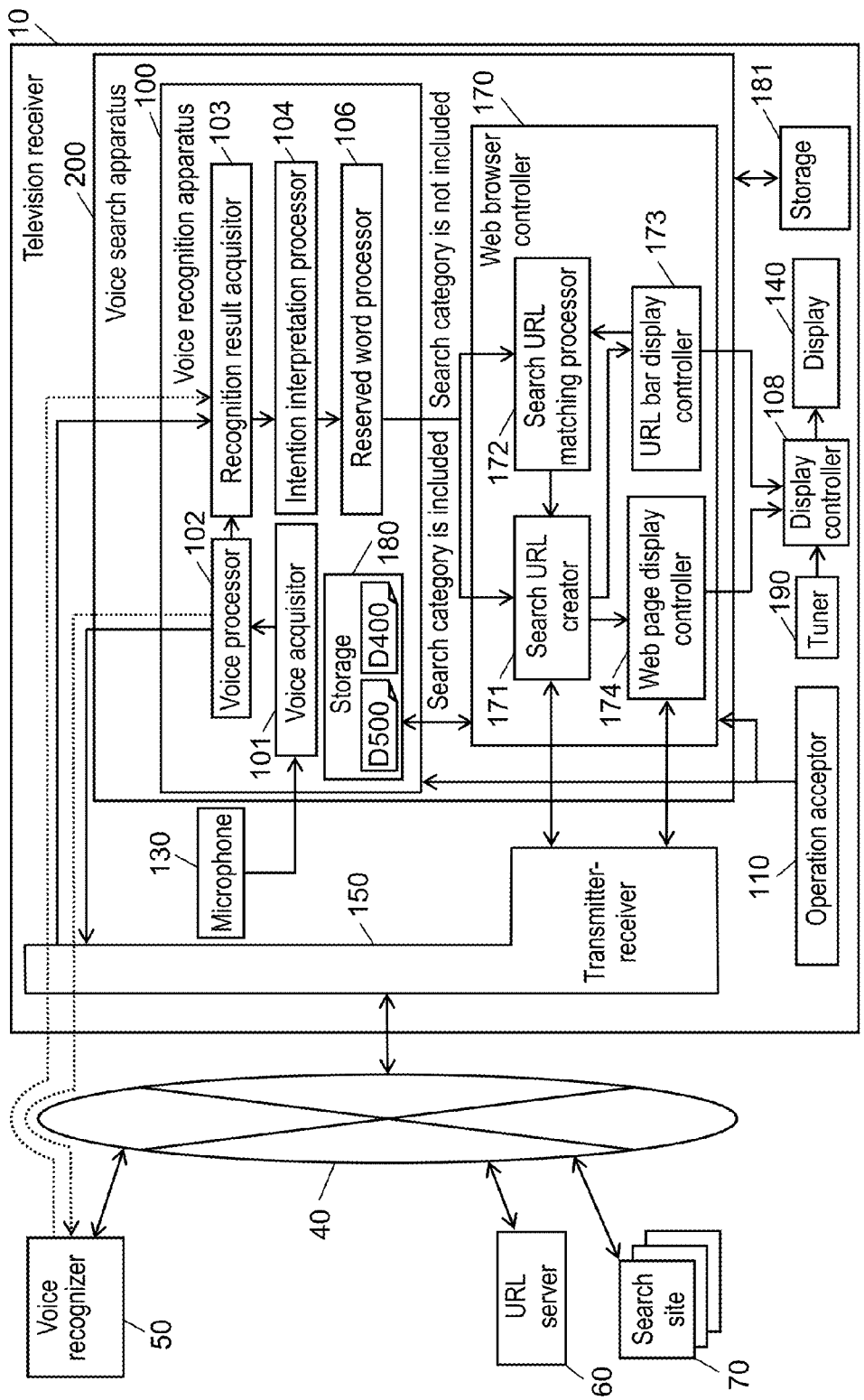
FIG. 2 is a block diagram illustrating a configuration example of the voice recognition system according to the first exemplary embodiment.

FIG. 2 is a block diagram illustrating a configuration example of voice recognition system 11 according to the first exemplary embodiment. Note that remote controller 20 and mobile terminal 30 are omitted in FIG. 2.

Television 10 includes voice search apparatus 200, tuner 190, display controller 108, microphone 130, display 140, storage 181, operation acceptor 110, and transmitter-receiver 150. Television 10 may include a wireless communicator (not illustrated) that performs wireless communications with remote controller 20 or mobile terminal 30.

Voice search apparatus 200 includes voice recognition apparatus 100 and web browser controller 170.

Voice recognition apparatus 100 is configured to acquire the voice uttered by user 700 and to analyze the acquired voice. Voice recognition apparatus 100 is configured to then recognize a "free word" and "reserved word" that the voice indicates, and to control television 10 in accordance with the result of the recognition. The specific configuration of voice recognition apparatus 100 will be described later. Note that the "reserved word" is a previously determined term, and is a term registered in a reserved word table to be described later.

Microphone 130 is a microphone configured to collect a voice that mainly comes from a direction facing a display surface of display 140. That is, a sound-collecting direction of microphone 130 is set so as to collect the voice uttered by user 700 who faces display 140 of television 10. Microphone 130 may collect the voice uttered by user 700 accordingly. Microphone 130 may be provided inside an enclosure of television 10, and as illustrated in an example of FIG. 1, may be installed outside the enclosure of television 10.

Remote controller 20 illustrated in FIG. 1 is a controller for user 700 to perform remote control of television 10. In addition to a general configuration required for remote control of television 10, remote controller 20 includes a microphone and an input unit. The microphone is configured to collect the voice uttered by user 700 and to output a voice signal. The input unit is configured to accept an input operation performed by user 700 manually, and to output an input signal in response to the input operation. This input unit, which is, for example, a touchpad, may also be a keyboard, a button, or the like. The voice signal generated from the voice collected by the microphone, or the input signal generated by user 700 performing the input operation on the input unit is wirelessly transmitted to television 10 by, for example, infrared rays, electromagnetic waves, or any other wireless medium.

Display controller 108 performs processing such as decoding and multiplexing of a plurality of pieces of image data, such as image data generated by web browser controller 170 and image data based on a broadcast signal that tuner 190 receives via an antenna (not illustrated). Display controller 108 then generates an image signal of an image to be displayed on display 140. Then, display controller 108 controls display 140, and displays the image based on those image signals on display 140.

Display 140, which is, for example, a liquid crystal display, may also be a display such as a plasma display and an organic EL (Electro Luminescence) display. Display 140 is controlled by display controller 108, and displays an image based on image signals such as an external input video signal and an image signal generated by display controller 108 based on a signal such as the broadcast signal received by tuner 190.

Transmitter-receiver 150 is connected to network 40, and is configured to communicate via network 40 with an external device (for example, voice recognizer 50, URL server 60, search site 70, and any other device) connected to network 40.

Tuner 190 is configured to receive a television broadcast signal of terrestrial broadcasting or satellite broadcasting via an antenna (not illustrated). Tuner 190 may be configured to receive the television broadcast signal transmitted via a cable.

Storage 181, which is, for example, a nonvolatile semiconductor memory, may be a device such as a volatile semiconductor memory and a hard disk. Storage 181 stores information (data), a program, and the like to be used for control of each unit of television 10.

Mobile terminal 30 illustrated in FIG. 1 is, for example, a smart phone, on which software for remotely controlling television 10 may run. Therefore, in voice recognition system 11 according to the present exemplary embodiment, mobile terminal 30 on which the software is running may be used for remote control of television 10. Mobile terminal 30 includes a microphone and an input unit. In a similar manner to the microphone included in remote controller 20, the microphone incorporated in mobile terminal 30 is configured to collect the voice uttered by user 700 and to output a voice signal. The input unit is configured to accept an input operation performed by user 700 manually, and to output an input signal in response to the input operation. The input unit, which is, for example, a touch panel, may also be a keyboard, a button, etc. In a similar manner to remote controller 20, mobile terminal 30 on which the software is running wirelessly transmits, to television 10, the voice signal generated from the voice collected by the microphone, or the input signal generated by user 700 performing the input operation on the input unit by, for example, infrared rays, electromagnetic waves, or any other wireless medium.

Television 10, and remote controller 20 or mobile terminal 30 are connected by wireless communications, such as, for example, wireless LAN (Local Area Network) and Bluetooth (registered trademark).

Network 40, which is, for example, the Internet, may be another network.

Voice recognizer 50 is a server connected to television 10 via network 40 (for example, a server on a cloud). Voice recognizer 50 receives voice information transmitted from television 10, and converts the received voice information into a character string. Note that this character string may be a plurality of characters, and may be one character. Then, voice recognizer 50 transmits character string information (text information) that indicates the converted character string to television 10 via network 40 as a result of the voice recognition.

Search site 70 is a web-site server, connected to network 40, for providing a search service on network 40. One server may be used for search site 70, and two or more servers may be used. The server for search site 70 is configured to provide the following services. When user 700 performs a user operation for a purpose of search with a terminal connected to network 40 (for example, television 10), a character string that indicates a query string based on the user operation and a path is set in a URL bar (Uniform Resource Locator bar) of a web browser. This URL bar includes information on the character string based on the user operation and information that specifies a specific server (for example, a server for performing a search). The server for search site 70 specified by the URL bar receives the character string information in the URL bar, and performs a search based on the character string information. The server then returns information that indicates a result of the search (information that indicates a web page resulting from the search) to the terminal.

Web browser controller 170 of television 10 is configured to perform information exchange described above with each server for search site 70.

URL server 60 is a server connected to television 10 via network 40. URL server 60 stores a search URL list. The search URL list corresponds to a table (list) that associates a template for the character string to be set in the URL bar of the web browser (hereinafter referred to as a "search URL template"), with a category to be searched (hereinafter referred to as a "search category"). The search category refers to a search range for performing a search with a free word. In this search URL list, a character string that indicates information such as a communication method (for example, "http" (Hyper Text Transfer Protocol)), each server name for search site 70 (for example, "search.co.jp", or the like), and a search category (for example, "images", or the like) is registered as a search URL template. Details of the search URL list will be described later. The search URL list in URL server 60 is updatably configured, and URL server 60 may update the search URL list regularly or irregularly by collecting information from network 40 or any other method.

Television 10 is configured to be capable of acquiring the search URL list from URL server 60 via network 40. This allows television 10 to update search URL list D500 stored in storage 180 of television 10 as necessary.

Voice recognition apparatus 100 of television 10 includes voice acquisitor 101, voice processor 102, recognition result acquisitor 103, intention interpretation processor 104, reserved word processor 106, and storage 180.

Voice acquisitor 101 is configured to acquire the voice signal generated from the voice uttered by the user. Voice acquisitor 101 may acquire the voice signal generated from the voice uttered by the user, from microphone 130 incorporated in television 10, from a microphone incorporated in remote controller 20, or a microphone incorporated in mobile terminal 30 via a wireless communicator (not illustrated). Then, voice acquisitor 101 converts the voice signal into voice information that may be used for various types of downstream processing, and outputs the voice information to voice processor 102. Note that when the voice signal is a digital signal, voice acquisitor 101 may use the voice signal as it is as the voice information.

Voice processor 102 is configured to perform "reserved word recognition processing" and to convert the voice information into reserved word information. The "reserved word recognition processing" refers to processing for determining whether a preset reserved word is included in the voice information acquired from voice acquisitor 101, and if included, for specifying the reserved word. Specifically, voice processor 102 refers to reserved word table D400 previously stored in storage 180, based on the voice information acquired from voice acquisitor 101. Reserved word table D400 is an association table in which the voice information is associated with reserved words. The plurality of reserved words is registered in reserved word table D400, and each of the reserved words is associated with a piece of voice information different from one another. Therefore, voice processor 102 may determine whether the reserved word is included in the voice information by collating the voice information with reserved word table D400.

Figure 3:
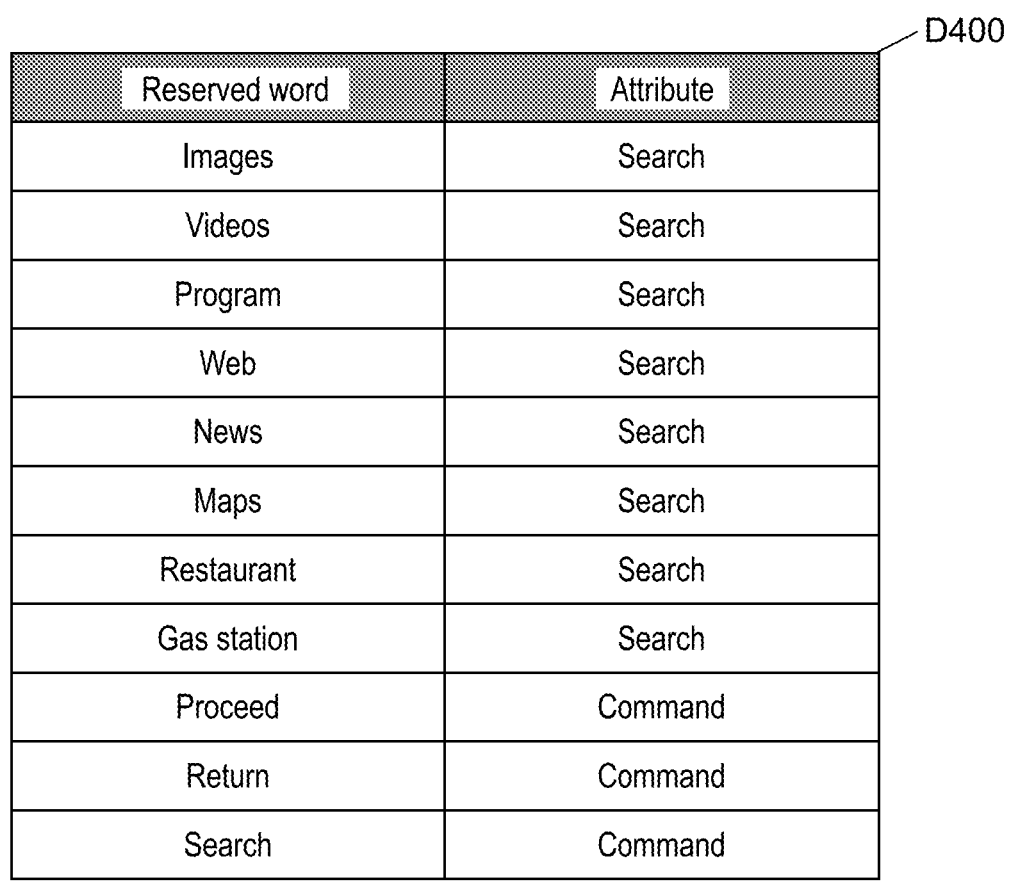
FIG. 3 is a diagram schematically illustrating an example of a reserved word table stored in a storage of a voice recognition apparatus according to the first exemplary embodiment.

Here, reserved word table D400 will be described with reference to FIG. 3. FIG. 3 is a diagram schematically illustrating an example of reserved word table D400 stored in storage 180 of voice recognition apparatus 100 according to the first exemplary embodiment.

Reserved word table D400 illustrated as an example in FIG. 3 is stored in storage 180 of voice recognition apparatus 100. The plurality of reserved words and information that indicates attributes of the reserved words are associated with each other and registered in reserved word table D400.

In the example illustrated in FIG. 3, in reserved word table D400, words such as "images", "videos", "program", "Web", "news", "maps", "restaurant", "gas station", "proceed", "return", and "search" are registered as the reserved words, and words such as "search" and "command" are registered as the attributes for the reserved words. In reserved word table D400, words to be used for directions to television 10 (hereinafter referred to as "direction information") are classified into "command", and words to be used for specification of the search category are classified into "search". In reserved word table D400, the attribute of each of "images", "videos", "program", "Web", "news", "maps", "restaurant", and "gas station" is "search", and the attribute of each of "proceed", "return", and "search" is "command". Note that the word that specifies the search category refers to a word that specifies the search range for performing a search with a free word.

Voice processor 102 refers to reserved word table D400. When the reserved word included in the voice information acquired from voice acquisitor 101 is specified, voice processor 102 outputs "reserved word information" to recognition result acquisitor 103 as a result of the voice recognition. The "reserved word information" refers to information that represents the reserved word included in the voice information and the attribute of the reserved word.

For example, when the reserved word of "images" is included in the voice information, voice processor 102 collates the voice information with reserved word table D400, and outputs the reserved word information that indicates that the reserved word included in the voice information is "images", and that the attribute of the reserved word is "search", to recognition result acquisitor 103.

Note that reserved word table D400 illustrated in FIG. 3 is a mere example, and a word other than the reserved words illustrated in FIG. 3 may be registered in reserved word table D400 as the reserved word. In addition, a reserved word with an attribute other than "search" and "command" may be registered in reserved word table D400.

In addition, voice processor 102 transmits the voice information acquired from voice acquisitor 101, from transmitter-receiver 150 via network 40 to voice recognizer 50.

Voice recognizer 50 is configured to perform "free word recognition processing" and to convert the voice information into the character string information (text information). On receipt of the voice information transmitted from television 10, voice recognizer 50 separates the voice information into clauses in order to distinguish a free word from words other than the free word, and converts each clause into a character string (hereinafter referred to as "dictation"). Examples of the words other than the free word include a particle, a preposition, and any other word. Then, voice recognizer 50 transmits information on the character string after dictation (character string information) to television 10 as a result of the voice recognition. That is, voice recognizer 50 recognizes the voice that is input, converts the voice into the character string information, and outputs the character string information. Note that the reserved word may be included in the free word in voice recognizer 50.

Note that voice recognizer 50 is configured to receive all the voice information transmitted from television 10, to dictate all the received voice information, and to transmit all the character string information obtained as a result of the dictation to television 10. However, the present exemplary embodiment is not limited to this configuration. For example, voice recognizer 50 may acquire voice information other than the reserved word from the received voice information, or may convert the voice information other than the reserved word from the received voice information into a character string, and may return the character string. Alternatively, television 10 may transmit the voice information other than the reserved word to voice recognizer 50.

Recognition result acquisitor 103 acquires the reserved word information as the result of the voice recognition from voice processor 102. In addition, recognition result acquisitor 103 acquires the character string information as the result of the voice recognition from voice recognizer 50 via network 40 and transmitter-receiver 150. Then, recognition result acquisitor 103 outputs the acquired reserved word information and character string information to intention interpretation processor 104.

Intention interpretation processor 104 is an example of "a sorter". Intention interpretation processor 104 is configured to sort the reserved word information and free word information from the character string information. On acquisition of the reserved word information and character string information from recognition result acquisitor 103, intention interpretation processor 104 sorts the "free word" and the "reserved word" from the character string information, based on the reserved word information. Note that the free word in intention interpretation processor 104 corresponds to a character string obtained by removing words such as the reserved word, particle, and preposition from the character string information. Therefore, the free word in intention interpretation processor 104 does not include the reserved word. In addition, intention interpretation processor 104 extracts information that indicates the attribute of the reserved word from the reserved word information. Then, based on the sorted free word, reserved word, and the information that indicates the attribute of the reserved word, intention interpretation processor 104 performs intention interpretation for specifying intention of the voice operation uttered by user 700. Details of the operation of intention interpretation processor 104 will be described later. Each piece of information which is output from intention interpretation processor 104 and which indicates the free word, reserved word, and attribute of the reserved word (free word information and reserved word information) is input into reserved word processor 106.

Reserved word processor 106 is configured to confirm, on acquisition of the information from intention interpretation processor 104, whether the information includes predetermined information. This predetermined information corresponds to information that represents a "reserved word with the attribute of "search"". Web browser controller 170 according to the present exemplary embodiment is configured to switch subsequent processing depending on whether the reserved word with the attribute of "search" is included in the information that is output from intention interpretation processor 104. Specifically, when reserved word processor 106 determines that the reserved word with the attribute of "search" is included in the information that is output from intention interpretation processor 104, search URL creator 171 of web browser controller 170 executes processing. On the other hand, when reserved word processor 106 determines that the reserved word with the attribute of "search" is not included in the information that is output from intention interpretation processor 104, search URL matching processor 172 of web browser controller 170 executes processing.

Note that reserved word processor 106 determines that the reserved word with the attribute of "search" is not included in the information that is output from intention interpretation processor 104, when reserved word processor 106 determines that the reserved word is not included and only the free word is included in the information that is output from intention interpretation processor 104, or when reserved word processor 106 determines that only the reserved word with the attribute other than "search" is included. Details of these operations will be described later.

Storage 180, which is, for example, a nonvolatile semiconductor memory, may be a device such as a volatile semiconductor memory and a hard disk. Storage 180 is configured to allow writing and reading of data arbitrarily. Storage 180 stores reserved word table D400 to be referred to by voice processor 102, search URL list D500 to be referred to by web browser controller 170, and any other data. Note that storage 180 and storage 181 may be integrated into one unit.

Web browser controller 170 of television 10 includes search URL creator 171, search URL matching processor 172, URL bar display controller 173, and web page display controller 174.

Search URL creator 171 is an example of a "URL creator". Search URL creator 171 is configured, when the free word and the reserved word with the attribute of "search" are included in the information that is output from intention interpretation processor 104, to refer to search URL list D500 stored in storage 180 based on the reserved word.

A character string that represents part of the URL is registered in search URL list D500 for each reserved word. In search URL list D500, the reserved word indicates the range to be searched (that is, the search category).

Here, search URL list D500 will be described with reference to FIG. 4. FIG. 4 is a diagram schematically illustrating an example of search URL list D500 stored in storage 180 of voice recognition apparatus 100 according to the first exemplary embodiment.

Search URL list D500, with an example illustrated in FIG. 4, is stored in storage 180 of voice recognition apparatus 100. The plurality of reserved words with the attribute of "search" and the search URL templates to be used for search of the range to be searched indicated by the reserved words are associated with each other and registered in search URL list D500. That is, search URL list D500 is a "URL list" in which the character strings that represent part of the URLs are registered for respective reserved words (search categories), and is a list of the search URL templates in which the "reserved words (search categories)" are registered as index.

In the example illustrated in FIG. 4, for example, when the reserved word is "images", the search URL template corresponding to the reserved word is as follows.
http://search.co.jp/images?q=
In this search URL template, "http" denotes a communication method, "search.co.jp" denotes a server name for search site 70 to which a search request is made, and "images" denotes that the category to be searched is "images". Also, a free word is added after "?q=". Thus, the search URL templates different from one another are registered for respective reserved words in search URL list D500.

Then, search URL creator 171 refers to search URL list D500, and reads the search URL template corresponding to the reserved word from search URL list D500.

For example, it is assumed that character strings of the reserved word of "images" and the free word of "ABC" are included in output from intention interpretation processor 104. In this case, search URL creator 171 reads the search URL template corresponding to the reserved word of "images" from search URL list D500. Then, search URL creator 171 adds the character string of "ABC", which is a free word, to a final part of the read search URL template. As a result, if based on the example illustrated in FIG. 4, the following character string is created.
http://search.co.jp/images?q=ABC
This character string will be a new URL (that is, search URL) to be used for search processing.

Search URL creator 171 thus generates the URL to be used for search processing (search URL), based on the reserved word with the attribute of "search" (FIG. 3), search URL list D500 (FIG. 4), and the character string of the free word.

Search URL matching processor 172 is an example of a "matching unit". Search URL matching processor 172 is configured to perform the following processing when the reserved word with the attribute of "search" is not included in the information that is output from reserved word processor 106.

Search URL matching processor 172 acquires information on the URL from URL bar display controller 173. This URL is a URL managed by URL bar display controller 173 as a URL for displaying a web page displayed on display 140 of television 10.

The following indicates an example of the URL managed by URL bar display controller 173. For example, when a web page for a map search with the free word of "ABC" is displayed on display 140 of television 10, the following URL is managed by URL bar display controller 173.
http://search.co.jp/maps?q=ABC
Alternatively, when a web page for a restaurant search with the free word of "ABC" is displayed on display 140, the following URL is managed by URL bar display controller 173.
http://web-navi.co.jp/
search?category=restaurant&query=ABC
Then, search URL matching processor 172 performs collation (that is, matching processing) between the URL acquired from URL bar display controller 173 and the search URL templates in search URL list D500 stored in storage 180.

Search URL matching processor 172 reads the search URL template from search URL list D500 sequentially, and examines whether the character string of the read search URL template is included in the URL acquired from URL bar display controller 173. Specifically, search URL matching processor 172 examines whether the character string of the URL acquired from URL bar display controller 173 includes a character string that agrees with the character string of the read search URL template. When the search URL template that is determined to include the agreeing character string is included in search URL list D500, search URL matching processor 172 determines that the matching processing has succeeded. Then, search URL matching processor 172 reads the search URL template, and adds the character string of the free word that is output from reserved word processor 106 to the final part of the character string of the read search URL template. Search URL matching processor 172 thus creates the new URL to be used for search processing (that is, search URL).

Note that voice recognition apparatus 100 may acquire the search URL list from URL server 60 regularly or irregularly, and may use the acquired search URL list to update search URL list D500 stored in storage 180. Alternatively, voice recognition apparatus 100 may acquire the search URL list from URL server 60 at timing when search URL creator 171 or search URL matching processor 172 uses search URL list D500. Note that details of processing for determining the above search category will be described later.

URL bar display controller 173 is configured to manage the URL of the web page that web page display controller 174 displays on display 140 via display controller 108. Also, URL bar display controller 173 is configured to control the character string to be displayed on the URL bar.

Web page display controller 174 includes components such as a parse processor, a DOM (Document Object Model) creator, a renderer, and a JavaScript (registered trademark) engine (no component is illustrated). Also, web page display controller 174 displays, on display 140 via display controller 108, files acquired from a website or a local storage, such as HTML (Hyper Text Markup Language), CSS (Cascading Style Sheets), PNG (Portable Network Graphics), and JavaScript (registered trademark).

Operation acceptor 110 receives an input signal generated by an input operation performed by user 700 with an input unit of remote controller 20, or an input signal generated by an input operation performed by user 700 with an input unit of mobile terminal 30, from remote controller 20 or mobile terminal 30 via a wireless communicator (not illustrated). In this way, operation acceptor 110 accepts the operation performed by user 700 (that is, user operation).

[1-2. Operation]

Next, an operation of voice search apparatus 200 of television 10 according to the present exemplary embodiment will be described.

First, methods for starting voice recognition processing by voice recognition apparatus 100 of television 10 will be described. The methods for starting voice recognition processing by voice recognition apparatus 100 mainly include the following two methods.

The first method for starting is as follows. In order to start voice recognition processing, user 700 presses a microphone button (not illustrated) that is one of the input unit provided in remote controller 20. When user 700 presses the microphone button of remote controller 20, in television 10, operation acceptor 110 accepts that the microphone button of remote controller 20 is pressed. Then, television 10 alters volume of a speaker (not illustrated) of television 10 into preset volume. This volume is sufficiently low volume to avoid disturbance of voice recognition by the microphone of remote controller 20. Then, when the volume of the speaker of television 10 becomes the preset volume, voice recognition apparatus 100 starts voice recognition processing. At this time, when the volume of the speaker is equal to or lower than the preset volume, television 10 does not need to perform the above volume adjustment, and leaves the volume as it is.

Note that this method may also use mobile terminal 30 (for example, a smart phone including a touch panel) instead of remote controller 20. In this case, user 700 starts software (for example, software for performing voice operation of television 10) included in mobile terminal 30, and presses the microphone button displayed on the touch panel by the software running. This user operation corresponds to a user operation of pressing the microphone button of remote controller 20. This causes voice recognition apparatus 100 to start voice recognition processing.

The second method for starting is as follows. User 700 utters a voice representing a preset command to start voice recognition processing (start command), to microphone 130 of television 10. Note that this voice is, for example, "Hi, television", "start voice operation", or any other voice. However, the start command for voice recognition processing is not limited to these voices, and may be another voice. When voice recognition apparatus 100 recognizes that the voice collected by microphone 130 is the preset start command, television 10 alters the volume of the speaker of television 10 into the preset volume in a similar manner to the above method, and voice recognition apparatus 100 starts voice recognition processing.

Note that the above methods may be combined to define a method for starting voice recognition processing by voice recognition apparatus 100.

It is assumed that these types of control in television 10 are performed by a controller (not illustrated) that controls each block of television 10.

When voice recognition apparatus 100 starts voice recognition processing, in order to prompt user 700 to utter a voice, as illustrated in FIG. 1 for example, display controller 108 displays, on an image display screen of display 140, voice recognition icon 201 indicating that voice recognition processing has started and that voice operation by user 700 has become available, and indicator 202 indicating volume of the voice that is being collected.

Note that display controller 108 may display, on display 140, a message indicating that voice recognition processing has started, instead of voice recognition icon 201. Alternatively, display controller 108 may output a message indicating that voice recognition processing has started, with a voice from the speaker.

Note that voice recognition icon 201 and indicator 202 are not limited to designs illustrated in FIG. 1. Any design may be used as long as an intended effect is obtained.

Next, voice recognition processing to be performed by voice recognition apparatus 100 of television 10 will be described.

In the present exemplary embodiment, voice recognition apparatus 100 performs a first type and a second type of voice recognition processing. The first type is voice recognition processing for recognizing a voice corresponding to a preset reserved word (hereinafter referred to as "reserved word recognition processing"). The second type is voice recognition processing for recognizing a word other than the preset reserved word as the free word (hereinafter referred to as "free word recognition processing").

As described above, the reserved word recognition processing is performed by voice processor 102 included in voice recognition apparatus 100. Voice processor 102 compares the voice information based on the voice uttered by user 700 to television 10 with reserved word table D400 previously stored in storage 180. Then, when the voice information includes the reserved word registered in reserved word table D400, voice processor 102 specifies the reserved word.

The free word recognition processing is performed using voice recognizer 50 connected to television 10 via network 40, as described above. Voice recognizer 50 acquires the voice information from television 10 via network 40. Then, voice recognizer 50 separates the acquired voice information into clauses, and isolates a free word from words other than the free word (for example, particles, prepositions, and any other words). In this way, voice recognizer 50 performs dictation. When performing dictation, voice recognizer 50 uses a database that associates the voice information with the character string. Voice recognizer 50 compares the acquired voice information with the database to isolate the free word from words other than the free word, and converts each word into a character string.

Thus, the reserved word recognition processing and the free word recognition processing are performed as voice recognition processing in voice recognition apparatus 100 of television 10, and television 10 performs processing based on results of the reserved word recognition processing and the free word recognition processing. Television 10 is configured, when the reserved word is a command (hereinafter referred to as "search command") associated with a preset application for search (hereinafter referred to as "search application"), to perform free word search with the search application.

For example, when user 700 utters "Search images for ABC", voice recognition apparatus 100 determines that the acquired voice includes the free word of "ABC", the reserved word of "images" with the attribute of "search", and the reserved word of "search" with the attribute of "command". As a result, television 10 performs processing for searching the reserved word (search category) of "images" for the free word of "ABC".

Note that, in the present exemplary embodiment, voice recognizer 50 is configured to receive from television 10 all the voices (voice information) acquired by voice acquisitor 101, to perform dictation of all pieces of the voice information, and to transmit all pieces of resulting character string information to television 10. However, voice processor 102 of television 10 may be configured to transmit the voice information other than the reserved word recognized using reserved word table D400 to voice recognizer 50.

Next, the free word recognition processing will be described with reference to FIG. 5.

FIG. 5 is a diagram illustrating an outline of dictation performed by voice recognition system 11 according to the first exemplary embodiment.

FIG. 5 illustrates a state where a web browser is displayed on display 140 of television 10. For example, when user 700 performs a search with a free word (that is, free word search) using an Internet search application of the web browser, an image illustrated in FIG. 5 as an example is displayed on display 140.

Note that the Internet search application of the web browser illustrated in FIG. 5 as an example may start based on the above reserved word recognition processing, or may start based on a user operation using remote controller 20 or other instrument.

Entry field 203 is an area for entry of a free word to be used for the search on the web browser. While a cursor is displayed in entry field 203, user 700 may enter a free word in entry field 203.

When user 700 utters a voice in this state toward remote controller 20, mobile terminal 30, or microphone 130 of television 10, a voice signal generated from the voice is input into voice acquisitor 101, and is converted into voice information. Then, the voice information is transmitted from television 10 via network 40 to voice recognizer 50. For example, when user 700 utters "ABC", the voice information based on this voice is transmitted from television 10 to voice recognizer 50.

Voice recognizer 50 compares the voice information received from television 10 with the database to convert the voice information into a character string. Then, as a result of the voice recognition of the received voice information, voice recognizer 50 transmits information on the character string (that is, character string information) via network 40 to television 10. Voice recognizer 50 compares, when the received voice information is generated from the voice of "ABC", the voice information with the database to convert the voice information into the character string of "ABC", and transmits the character string information to television 10.

On receipt of the character string information from voice recognizer 50, television 10 causes recognition result acquisitor 103, intention interpretation processor 104, reserved word processor 106, display controller 108, and any other unit to operate in accordance with the character string information. Television 10 then displays the character string corresponding to the character string information in entry field 203. For example, on receipt of the character string information that indicates the character string of "ABC" from voice recognizer 50, television 10 displays the character string of "ABC" in entry field 203.

Thus, voice recognition apparatus 100 may acquire the voice uttered by the user, convert the voice into the character string by performing voice recognition processing, and input the character string into television 10.

Then, the web browser displayed on display 140 of television 10 performs a free word search with the character string displayed in entry field 203.

Note that as an example of search processing performed by television 10, the present exemplary embodiment has cited an example of starting the web browser and performing the Internet search based on the free word, as described above. However, the search processing to be performed by television 10 is not limited to this example. For example, television 10 may perform processing such as search processing for searching a program guide for a program based on the free word, and search processing for searching a plurality of recorded programs for a recorded program based on the free word.

Also, television 10 may include a command processor that executes command processing based on a reserved word when the reserved word is not a search command. Examples of such a reserved word include words such as "play" for instructing to play a recorded program and "record" for instructing to record a program.

Next, free word search processing to be performed by web browser controller 170 of television 10 according to the present exemplary embodiment will be described with reference to FIG. 6 to FIG. 9.

Figure 6:
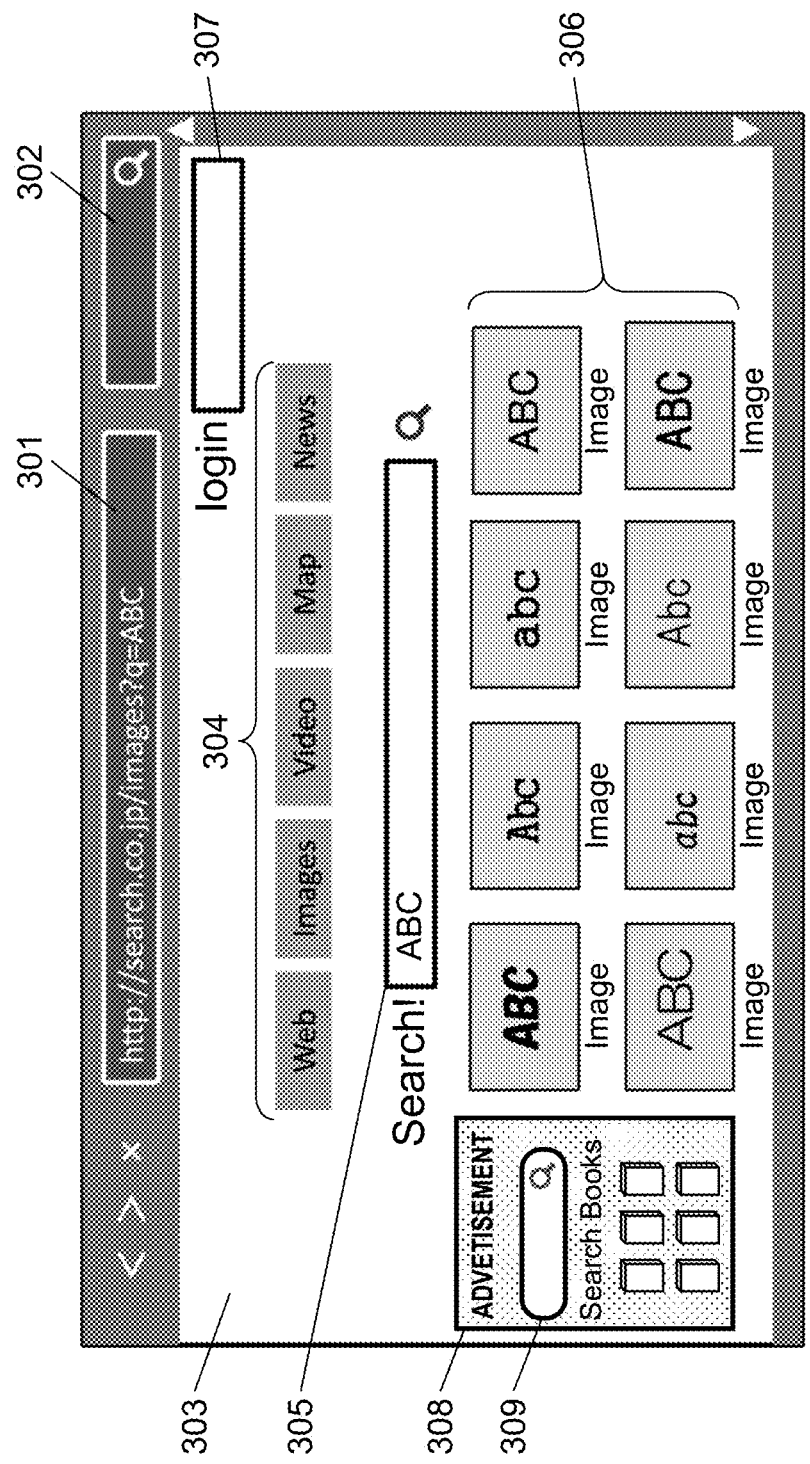
FIG. 6 is a diagram illustrating an example of a web browser displayed on a display of a television receiver according to the first exemplary embodiment.

FIG. 6 is diagram illustrating an example of the web browser displayed on display 140 of television 10 according to the first exemplary embodiment.

When television 10 starts the web browser and displays a search site on the web browser, as illustrated in FIG. 6 for example, display 140 displays URL bar 301 of the web browser, search bar 302 of the web browser, web page 303 of the search site the web browser displays, a plurality of buttons 304 on web page 303, search character string entry area 305 on web page 303, a plurality of search results 306 on web page 303, login character string entry area 307 on web page 303, advertisement 308 displayed on web page 303, search character string entry area 309 in advertisement 308, and any other component.

Figure 7:
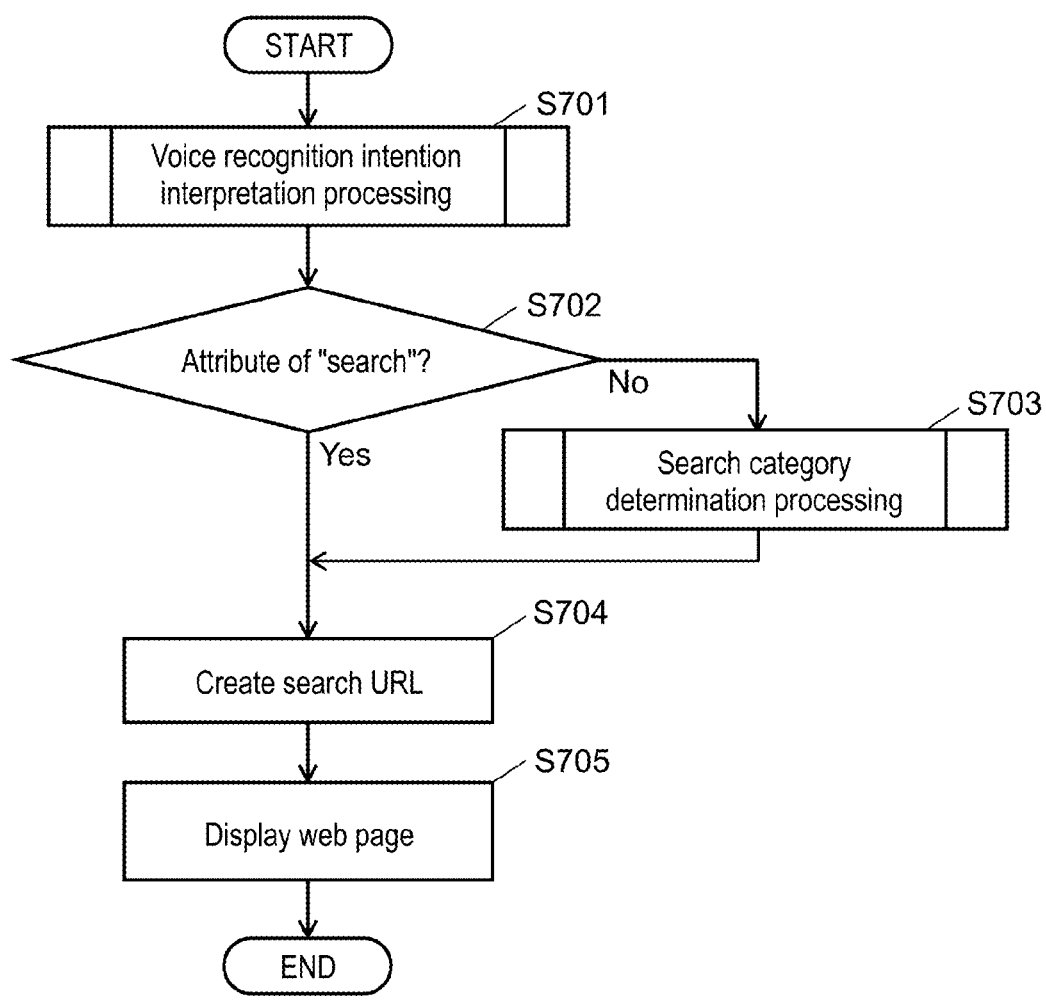
FIG. 7 is a flow chart illustrating an operation example of voice search processing to be performed by the voice recognition system according to the first exemplary embodiment.

FIG. 7 is a flow chart illustrating an operation example of the voice search processing to be performed by voice recognition system 11 according to the first exemplary embodiment.

Figure 8:
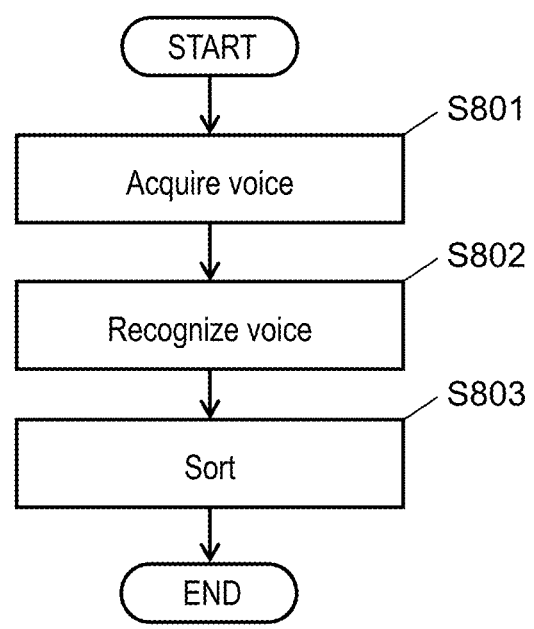
FIG. 8 is a flow chart illustrating an operation example of voice recognition intention interpretation processing to be performed by the voice recognition system according to the first exemplary embodiment.

FIG. 8 is a flow chart illustrating an operation example of voice recognition intention interpretation processing to be performed by voice recognition system 11 according to the first exemplary embodiment.

FIG. 9 is a flow chart illustrating an operation example of search category determination processing to be performed by voice recognition system 11 according to the first exemplary embodiment.

As illustrated in FIG. 7, in voice recognition system 11, after the voice search processing starts, voice recognition intention interpretation processing is performed first (step S701).

The voice recognition intention interpretation processing of step S701 will be described with reference to FIG. 8.

As described above, in television 10, an operation of user 700, for example, pressing the microphone button of remote controller 20 causes voice recognition apparatus 100 to start voice recognition processing.

When user 700 utters a voice in this state, the voice of user 700 is converted into a voice signal by microphone 130, the microphone of remote controller 20, or the microphone of mobile terminal 30, and the voice signal is input into voice acquisitor 101. In this way, voice acquisitor 101 acquires the voice signal of user 700 (step S801).

Voice acquisitor 101 converts the acquired voice signal of user 700 into voice information that may be used for various types of downstream processing, and outputs the voice information to voice processor 102. When user 700 utters, for example, "Search images for ABC", voice acquisitor 101 outputs the voice information based on the voice to voice processor 102.

Voice processor 102 compares the voice information that is output from voice acquisitor 101 with reserved word table D400 previously stored in storage 180. Then, voice processor 102 examines whether the voice information that is output from voice acquisitor 101 includes information corresponding to the reserved words registered in reserved word table D400 (step S802).

For example, when the voice information that is output from voice acquisitor 101 includes voice information based on a word of "search" uttered by user 700, and when "search" has been registered in reserved word table D400 as the reserved word with the attribute of "command", voice processor 102 determines that the word of "search", which is the reserved word with the attribute of "command", is included in the voice information.

Then, voice processor 102 outputs the reserved word information that represents the reserved word included in the voice information and the attribute of the reserved word to recognition result acquisitor 103.

Note that, as illustrated in FIG. 3, words to be used for operations such as the operation of television 10 and the operation of the web browser are registered in reserved word table D400 as the reserved words.

In addition, reserved word table D400 is configured to allow update through addition, deletion, or any other operation of the reserved word. For example, user 700 may add a new reserved word to reserved word table D400. Alternatively, a new reserved word may be added to reserved word table D400 via network 40. This allows voice recognition apparatus 100 to perform voice recognition processing in accordance with updated reserved word table D400.

In addition, in step S802, voice processor 102 transmits the voice information that is output from voice acquisitor 101, from transmitter-receiver 150 via network 40 to voice recognizer 50.

Voice recognizer 50 converts the received voice information into character strings with a free word being isolated from a word other than the free word (for example, prepositions, particles, and the like).

Voice recognizer 50 compares the database that associates the free word with the character string, with the received voice information. When the received voice information includes the free word registered in the database, voice recognizer 50 selects the character string (including one character) corresponding to the free word. Note that the reserved word may be included in the free word in voice recognizer 50. In this way, voice recognizer 50 converts the received voice information into the character strings. For example, when voice recognizer 50 receives voice information based on the voice "Search images for ABC" uttered by user 700, voice recognizer 50 converts the voice information into the character strings of "search", "images", "for", and "ABC". Voice recognizer 50 transmits character string information representing each of the converted character strings (text information) via network 40 to television 10 (step S802).

This database, which is included in voice recognizer 50, may be at another place on network 40. Also, this database may be configured so that registered information may be updated regularly or irregularly.

Recognition result acquisitor 103 of television 10 acquires the reserved word information that is output from voice processor 102 as a result of the voice recognition (this reserved word information includes the reserved word and the attribute), and the character string information transmitted from voice recognizer 50 as a result of the voice recognition (this character string information includes the free word and the reserved word). Recognition result acquisitor 103 then outputs the reserved word information and the character string information to intention interpretation processor 104.

In order to specify intention of the voice operation uttered by user 700, intention interpretation processor 104 sorts the character string information based on the reserved word information acquired from recognition result acquisitor 103 (step S803).

Intention interpretation processor 104 removes, for example, the reserved word from the character string information by collating the character string information with the reserved word information. Here, intention interpretation processor 104 may compare reserved word table D400 illustrated as an example in FIG. 3 with the character string information. When the reserved word registered in reserved word table D400 is included in the character string information, intention interpretation processor 104 may remove the word as the reserved word from the character string information.

Then, intention interpretation processor 104 sorts the free word by removing the character strings that do not correspond to the free word, such as prepositions and particles, from the remaining character string information. Therefore, the reserved word is not included in the free word in intention interpretation processor 104.

For example, when acquiring the character string information such as "search", "images", "for", and "ABC", and the reserved word information representing "images" and "search", intention interpretation processor 104 sorts "ABC" as the free word, "images" as the reserved word with the attribute of "search", and "search" as the reserved word with the attribute of "command". Since intention interpretation processor 104 performs such sorting, television 10 may perform an operation in accordance with the intention of user 700 (intention of the voice operation uttered by user 700). In the above example, regarding the reserved word of "images" with the attribute of "search", television 10 may execute the reserved word of "search" with the attribute of "command" using the free word of "ABC".

Note that the reserved word with the attribute of "search" is, for example, a term to be used for specification of the search category, as illustrated as an example in FIG. 3, such as "images", "videos", "program", "Web", "news", "maps", "restaurant", and "gas station". Also, the reserved word with the attribute of "command" is, for example, a term to be used for operations of television 10 such as "proceed", "return", and "search", as illustrated as an example in FIG. 3. However, the reserved word is not limited to these terms.

Note that intention interpretation processor 104 may perform intention interpretation using the character string included in the character string information, such as a particle and a preposition.

Thus, intention interpretation processor 104 performs voice recognition intention interpretation processing of step S701.

Next, based on the processing of step S701, reserved word processor 106 determines whether information that is output from intention interpretation processor 104 includes the reserved word with the attribute of "search" (step S702).

When the determination is made in step S702 that the information that is output from intention interpretation processor 104 includes the reserved word with the attribute of "search" (Yes), the flow chart goes to step S704. Then, search URL creator 171 of web browser controller 170 creates the search URL based on the reserved word and free word included in the information that is output from intention interpretation processor 104 (step S704).

In step S704, search URL creator 171 refers to search URL list D500 stored in storage 180 based on the reserved word, and creates the search URL.

For example, when the words of "ABC" and "images" are included in the information that is output from intention interpretation processor 104, since "images" has been registered in reserved word table D400 as the reserved word with the attribute of "search", determination of "Yes" is made in step S702.

Then, search URL creator 171 creates the search URL that uses the free word of "ABC" and the reserved word of "images". Based on the reserved word of "images", search URL creator 171 reads the search URL template corresponding to the reserved word of "images" from search URL list D500 (FIG. 4). Then, search URL creator 171 adds the free word to the read search URL template. Accordingly, for example, based on the example of search URL list D500 illustrated in FIG. 4, the search URL of the following character string is created.
http://search.co.jp/images?q=ABC URL bar display controller 173 inputs the search URL created in step S704 into URL bar 301 (FIG. 6) of the web browser. Accordingly, a search based on the search URL is performed in search site 70. Information on the web page resulting from the search is read into the web browser by web page display controller 174. Then, the information on the web page is displayed by display controller 108 on the web browser displayed on display 140 (step S705).

In step S705, for example, an image as illustrated in FIG. 6 is displayed on display 140. FIG. 6 illustrates an example of the image in which a result of search of the reserved word of "images" for the free word of "ABC" is displayed on web page 303. Note that web page 303 illustrated in FIG. 6 is an example of the web page which is acquired from search site 70 and which is displayed on the web browser. Arrangement of each element, a method for displaying the search result, presence of advertisement, a number of character string entry areas, and any other design in web page 303 are not limited to the example illustrated in FIG. 6. Design of the web page may differ from search site to search site.

When the determination is made in step S702 that the information that is output from intention interpretation processor 104 does not include the reserved word with the attribute of "search" (No), the flow chart goes to step S703. Then, search URL matching processor 172 of web browser controller 170 performs processing for determining the search category. Hereinafter, the processing to be performed in step S703 may be referred to as "search category determination processing".

The search category indicates the range to be searched, and corresponds to the reserved word in search URL list D500 of FIG. 4 in the present exemplary embodiment.

Here, in what situation the determination of "No" is made in step S702 will be described with reference to a specific example.

It is assumed here that user 700 first utters "Search images for ABC", and that a search for the reserved word of "images" has already been performed for the free word of "ABC". It is assumed that, as a result of the search, for example, web page 303 illustrated in FIG. 6 has been displayed on display 140.

Note that this search is not limited to a search through the voice operation. For example, this search may be performed based on the user operation (input operation) using the input unit (for example, touchpad) of remote controller 20 and the input unit (for example, touch panel) of mobile terminal 30.

Following this state, when user 700 presses, for example, button 304 of "Map" on web page 303, the search category is changed from "images" to "maps" on the web browser. This operation may be performed by either the voice operation or the user operation using the input unit of remote controller 20 or mobile terminal 30 (that is, input operation by the user).

Accordingly, the web page displayed on the web browser moves from web page 303 illustrated in FIG. 6 to the web page corresponding to the search category of "maps" (for example, a web page of maps). That is, in accordance with information transmitted from the website that posts map information, the web page of maps is displayed on the web browser.

Subsequently, when user 700 utters only a free word of "XYZ", as a result of voice recognition intention interpretation processing of step S701, only information that indicates a character string of the free word of "XYZ" is output from intention interpretation processor 104.

Reserved word processor 106 determines that the reserved word with the attribute of "search" is not included in the information that is output from intention interpretation processor 104. Therefore, determination of "No" is made in step S702. Then, the flow chart goes to step S703.

In step S703, the search category determination processing is performed. Specifically, search URL matching processor 172 performs matching processing (matching processing of character strings) between search URL list D500 and the URL managed by URL bar display controller 173 (URL related to the web page displayed on display 140), and determines the search category based on a result of the matching processing (step S703).

Details of the search category determination processing of step S703 will be described with reference to FIG. 9.

In order to determine the search category, search URL matching processor 172 performs matching processing between the search URL templates registered in search URL list D500 and the URL managed by URL bar display controller 173, in predetermined order. The following description assumes that this order is order in which the search URL templates are registered in search URL list D500 (in the order from top of search URL list D500 illustrated in FIG. 4). However, the order of the matching processing is not limited to this order, and may be another order.

Search URL matching processor 172 substitutes an initial value "1" for variable n (step S901).

Next, search URL matching processor 172 acquires the character string of the URL managed by URL bar display controller 173, the character string being displayed in URL bar 301 (for example, URL bar 301 illustrated in FIG. 6) of the web browser (step S902). Hereinafter this character string is referred to as character string A.

Next, search URL matching processor 172 acquires, from search URL list D500, the character string of the nth registered search URL template in search URL list D500 (step S903).

In the example illustrated in FIG. 4, the search category with n=1 is "web" in a first line of search URL list D500, and the corresponding search URL template is as follows.
http://search.co.jp/web?q=
The search category with n=2 is "images" in a second line of search URL list D500, and the corresponding search URL template is as follows.
http://search.co.jp/images?q=
The search category with n=9 is "gas station" in a ninth line of search URL list D500, and the corresponding search URL template is as follows.
http://web-navi.co.jp/search?category=gas-station&query=
Thus, search URL matching processor 172 reads the search URL templates from search URL list D500 in accordance with variable n. Hereinafter, the character string of the search URL template corresponding to the variable n is referred to as character string B.

Next, search URL matching processor 172 determines whether any character string that agrees with character string B is included in character string A (step S904).

Here, this determination to be performed by search URL matching processor 172 in step S904 is referred to as matching processing. When it is determined in step S904 that a character string that agrees with character string B is included in character string A (that is, when the matching processing has succeeded) (Yes), the flow chart goes to step S905. Then, search URL matching processor 172 sets the search category that is nth registered in search URL list D500 as a return value, based on search URL list D500 (step S905).

For example, when character string B is
http://search.co.jp/images?q=
and character string A is
http://search.co.jp/images?q=ABC,
the character string that agrees with character string B is included in character string A, and thus the determination of "Yes" is made in step S904.

In the example illustrated in FIG. 4, if the determination of "Yes" is made in step S904 when n=1, "web" firstly registered in search URL list D500 is set as the return value in step S905. If the determination of "Yes" is made when n=2, "images" secondly registered in search URL list D500 is set as the return value.

When it is determined in step S904 that the character string that agrees with character string B is not included in character string A (that is, when the matching processing has failed) (No), search URL matching processor 172 adds 1 to variable n (step S906).

Next, search URL matching processor 172 collates variable n with a number of search categories registered in search URL list D500 (a number of search URL templates) (step S907).

When it is determined in step S907 that variable n is larger than the number of search categories registered in search URL list D500 (Yes), search URL matching processor 172 sets a preset search category (hereinafter referred to as "default search category") as the return value (step S908).

Step S908 is processing to be performed when the character string that agrees with character string B is included in none of the search URL templates registered in search URL list D500. Note that although the default search category is, for example, "web", the default search category may be another search category.

When it is determined in step S907 that variable n is equal to or less than the number of search categories registered in search URL list D500 (No), search URL matching processor 172 returns to step S903 and continues the matching processing. This processing is performed when the search URL template on which the matching processing has not been performed exists in search URL list D500.

Note that although variable n is used in the flow chart illustrated in FIG. 9 for repetitive processing, repetitive processing using an iterator may be performed.

Thus, when it is determined in step S702 that the reserved word with the attribute of "search" is not included in the information that is output from intention interpretation processor 104 (No), search URL matching processor 172 determines the search category by performing search category determination processing of step S703. Then, search URL matching processor 172 sets the determined search category as the return value, and outputs the return value to search URL creator 171 of web browser controller 170.

After completion of step S703, the flow chart goes to step S704. Then, search URL creator 171 reads, from search URL list D500, the search URL template corresponding to the return value that is output from search URL matching processor 172 (that is, the search category determined in step S703), and creates the search URL based on the read search URL template and the free word included in the information that is output from intention interpretation processor 104 (step S704). Processing of step S705 following step S704 is as described above.

Note that search URL matching processor 172 may set variable n as the return value. In this case, search URL creator 171 only needs to read the search URL template from search URL list D500 based on variable n.

The above search category determination processing will be described by citing a specific example. Here, a continuation of the above specific example of the determination of "No" in step S702 will be described as the specific example of the search category determination processing.

In this example, the information that is output from intention interpretation processor 104 does not include any reserved word with the attribute of "search", but includes only information that indicates the character string of the free word of "XYZ".

Also in this example, on the web browser is displayed a web page of a map obtained by a previous search performed by user 700. Therefore, search URL matching processor 172 sets the character string of the URL for displaying the web page of a map in character string A in step S902. This character string is, for example, as follows.
http://search.co.jp/maps?q=
If the search category of "maps" is searched for the free word of "ABC", the character string to be set in character string A is as follows, for example.
http://search.co.jp/maps?q=ABC Accordingly, when n=5 in step S904, that is, when the following search URL template corresponding to the search category of "maps" is set in character string B, search URL matching processor 172 succeeds in the matching processing.
http://search.co.jp/maps?q=
That is, it is determined that the character string that agrees with character string B is included in character string A. Therefore, in step S905, search URL matching processor 172 sets the search category of "maps" as the return value, and outputs the return value to search URL creator 171.

Search URL creator 171 reads, from search URL list D500, the following search URL template corresponding to the return value (here, the search category of "maps") that is output from search URL matching processor 172 in step S704.
http://search.co.jp/maps?q=

Then, based on the read search URL template and the free word of "XYZ" included in the information that is output from intention interpretation processor 104, search URL creator 171 creates the following search URL.
http://search.co.jp/maps?q=XYZ In step S705, URL bar display controller 173 inputs into URL bar 301 of the web browser the above search URL created by search URL creator 171. Information on the web page obtained from search site 70 resulting from this search (that is, a result of the search of the search category of "maps" for the free word of "XYZ") is read into the web browser by web page display controller 174. Then, the information on the web page is displayed by display controller 108 on the web browser displayed on display 140.

[1-3. Effect, Etc.]

As described above, in the present exemplary embodiment, the voice search apparatus includes the web page display controller, the voice recognizer, the matching unit, and the URL creator. The web page display controller controls the web page which is to be displayed on the display. The voice recognizer recognizes the voice that is input, converts the voice into character string information, and outputs the character string information. The matching unit refers to the URL list in which the character string representing part of the URL is registered for each search category, performs matching processing between the URL of the web page displayed on the display and the character string in the URL list, and specifies the character string corresponding to the URL in the URL list. The URL creator creates the URL based on the character string specified by the matching unit and the character string information.

Note that voice search apparatus 200 is an example of the voice search apparatus, web page display controller 174 is an example of the web page display controller, voice recognizer 50 is an example of the voice recognizer, search URL matching processor 172 is an example of the matching unit, search URL list D500 is an example of the URL list, and search URL creator 171 is an example of the URL creator.

When performing search processing continuously, user 700 who uses voice search apparatus 200 configured in this way may perform a new search based on contents of a previous search and new contents to be uttered, without uttering again contents that are input in the previous search.

For example, when searching for a new free word, a search category identical to the search category with which the previous search has been made, user 700 may omit utterance of the search category that overlaps the previous search. That is, user 700 only needs to utter the new free word.

As a specific example, after searching the search category of "maps" for the free word of "ABC" by uttering or input-operating "Search maps for ABC" immediately before, when performing a new search of the search category of "maps" for the free word of "XYZ", user 700 does not need to utter "Search maps for XYZ". User 700 only needs to utter "XYZ". Accordingly, in voice search apparatus 200, the search URL is created so that the search for the free word of "XYZ" may be performed on the search category of "maps" identical to the search category of which the previous search has been made. That is, only by uttering "XYZ", user 700 may perform search processing identical to the processing performed when uttering "Search maps for XYZ".

Thus, in voice search apparatus 200 according to the present exemplary embodiment, user 700 does not need to repeatedly utter a word that overlaps a word uttered at a time of the previous voice operation. This reduces complicatedness of performing voice operation of a device that includes voice search apparatus 200, and improves operativity.

Other Exemplary Embodiments

As described above, the first exemplary embodiment has been described as an example of a technique disclosed in the present application. However, the technique in the present disclosure is not limited to this example, and may be applied to exemplary embodiments to which change, replacement, addition, and omission have been made. In addition, it is also possible to make a new exemplary embodiment by combining elements described in the above first exemplary embodiment.

Therefore, other exemplary embodiments will be described below.

Search URL matching processor 172 may perform matching processing with a remaining section except for a previously prescribed character string (for example, a URL scheme), such as "http" and "https".

Also, when performing matching processing, search URL matching processor 172 may read one search URL template from search URL list D500, extract a domain name and query string, and determine whether each extracted character string is included in each of a domain name and query string of the URL managed by URL bar display controller 173.

A specific example will be cited to describe this operation example. For example, the following character string is registered in search URL list D500 illustrated in FIG. 4, as the search URL template corresponding to the search category of "gas station".
http://web-navi.co.jp/search?category=gas-station&query=
From this search URL template, a domain name of "web-navi.co.jp" and a query string of "category=gas-station" may be extracted, through the use of ":", which is a delimiter for a URL scheme and "?", which is a delimiter for a query string. Therefore, search URL matching processor 172 makes a determination that the matching processing has succeeded, when this character string of the domain name is included in the character string of the domain name of the URL managed by URL bar display controller 173, and when this character string of the query string is included in the character string of the query string of the URL managed by URL bar display controller 173. Note that it is also possible to configure search URL matching processor 172 to perform matching processing using the domain name and path, and matching processing using the path and query string, in addition to the above-described matching processing using the domain name and query string.

Note that search URL list D500 is not limited to data structure illustrated in FIG. 4. Search URL list D500 may be data structure in which the domain name, path, and query string are previously separated, and an element to be used for search category determination processing and other elements are separately registered. One specific example of this data structure will be described. For example, in the example of the search URL template corresponding to the search category of "gas station" in search URL list D500 illustrated in FIG. 4, the domain name of "web-navi.co.jp", the path of "/search", and the query string of "category=gas-station" are registered in search URL list D500 as the elements to be used for search category determination processing. In addition, the URL scheme of "http://", the path of "/search", and other item "q=" of the query string are registered in search URL list D500 as the elements which are not used for search category determination processing. Search URL list D500 may have such data structure.

Such data structure of search URL list D500 makes it possible to reduce a load of matching processing when search URL matching processor 172 performs search category determination processing.

When performing search category determination processing, search URL matching processor 172 may perform matching processing as follows. Search URL matching processor 172 does not perform matching processing on a search URL template corresponding to a default search category, and performs matching processing on search categories other than the default search category. Then, when all of the matching processing fails, search URL matching processor 172 sets the search category as the default search category.

Also, in the present exemplary embodiment, the operation example has been described in which voice search apparatus 200 makes a search on the Internet. However, the search to be performed by voice search apparatus 200 is not limited to the Internet search. Voice search apparatus 200 may perform, for example, a program search by a program guide application. In case of the program search by the program guide application, for example, as illustrated in the search URL template corresponding to the search category of "program" in search URL list D500 of FIG. 4, a "file" scheme or a scheme of an application name such as "epg_app" may be used. Alternatively, voice search apparatus 200 may search recorded programs, etc.

Note that, in television 10, voice recognition processing may be started by the aforementioned method. Therefore, after voice recognition processing is started, user 700 may perform the above search even while watching a program on television 10.

Television 10 may include a command processor that performs command processing other than search. Examples of this command processing include channel change and volume change of television 10. In addition, a command that may be executed by this command processor may be registered in reserved word table D400 as the reserved word with the attribute of "command", for example, "channel up", "volume up", "playback", "stop", "display character", and any other command.

Voice search apparatus 200 described in the present exemplary embodiment may be included in a device that does not include display 140.

While the example in which voice recognizer 50 is disposed on network 40 has been described in the present exemplary embodiment, voice recognizer 50 may be included in voice search apparatus 200.

In the present exemplary embodiment, reserved word table D400 and search URL list D500 may be stored in either storage 180 or storage 181. Alternatively, at least one of reserved word table D400 and search URL list D500 may be acquired via network 40 as necessary.

Note that each block illustrated in FIG. 2 may be configured as an independent circuit block, and may be configured such that a processor may execute software that is programmed to implement the operation of each block.

INDUSTRIAL APPLICABILITY

The present disclosure is applicable to devices that perform processing operations instructed by users. Specifically, the present disclosure is applicable to devices such as a car navigation system, a driving support system, a mobile terminal device, a television receiver, a personal computer (PC), a PC peripheral such as a printer, a set top box, a home audio visual system such as a video recorder and an optical disk player, a remote controller, a game machine, a smart phone, a tablet terminal, and a home electric appliance such as a microwave oven.

REFERENCE MARKS IN THE DRAWINGS

10 television receiver
11 voice recognition system
20 remote controller
30 mobile terminal
40 network
50 voice recognizer
60 URL server
70 search site
100 voice recognition apparatus
101 voice acquisitor
102 voice processor
103 recognition result acquisitor
104 intention interpretation processor
106 reserved word processor
108 display controller
110 operation acceptor
130 microphone 140 display
150 transmitter-receiver
170 web browser controller
171 search URL creator
172 search URL matching processor
173 URL bar display controller
174 web page display controller
180,181 storage
190 tuner
200 voice search apparatus
201 voice recognition icon
202 indicator
203 entry field
301 URL bar
302 search bar
303 web page
304 button
305 search character string entry area
306 search result
307 login character string entry area
308 advertisement
309 search character string entry area
700 user
D400 reserved word table
D500 search URL list

The invention claimed is:

1. A voice search apparatus comprising:
a web page display controller that controls a web page which is to be displayed on a display;
a voice processor that receives voice information from a voice that is input, determines if a preset reserved word is included in the voice information, and outputs reserved word information including an attribute of the reserved word;
a voice recognizer that converts the voice information into character string information, and outputs the character string information;
a storage that stores a URL list in which a character string representing part of a URL is registered for a search category;
a processor including a matching unit that refers to the URL list, performs matching processing between a first URL of the web page displayed on the display and the character string in the URL list, and specifies the character string in the URL list corresponding to the first URL; and
a URL creator that creates a second URL based on the character string specified by the matching unit and the character string information,
wherein the processor determines whether or not the reserved word information is included in the character string information,
wherein the URL creator creates the second URL based on the character string specified by the matching unit and the character string information when the processor determines that the reserved word information is not included in the character string information,
wherein the URL creator creates a third URL based on the URL list registered for the search category relevant to the reserved word information and the character string information except the reserved word information when the processor determines that the reserved word information is included in the character string information, and
wherein the web page display controller displays the web page, relevant to the second URL or the third URL created by the URL creator, on the display.

2. A voice search method comprising:
displaying a web page on a display;
recognizing a voice that is input and converting the voice into character string information; and
when an information relevant to a search category is not included in the character string information, referring to a URL list in which a character string representing part of a URL is registered for the search category, performing matching processing between a first URL of the web page displayed on the display and the character string in the URL list, and specifying the character string in the URL list corresponding to the first URL via a processor, and
creating a second URL based on the specified character string and the character string information,
when the information relevant to the search category is included in the character string information, creating a third URL based on the URL list registered for the search category and the character string information except the information relevant to the search category, and
displaying the web page, relevant to the second URL or the third URL, on the display.

3. A display apparatus comprising:
a display;
a web page display controller that controls a web page which is to be displayed on the display;
a voice processor that receives voice information from a voice that is input, determines if a preset reserved word is included in the voice information, and outputs reserved word information including an attribute of the reserved word;
a voice recognizer that converts the voice information into character string information, and outputs the character string information;
a storage that stores a URL list in which a character string representing part of a URL is registered for a search category;
a processor including a matching unit that refers to the URL list, performs matching processing between a first URL of the web page displayed on the display and the character string in the URL list, and specifies the character string in the URL list corresponding to the first URL; and
a URL creator that creates a second URL based on the character string specified by the matching unit and the character string information,
wherein the processor determines whether or not the reserved word information is included in the character string information,
wherein the URL creator creates the second URL based on the character string specified by the matching unit and the character string information when the processor determines that the reserved word information is not included in the character string information,
wherein the URL creator creates a third URL based on the URL list registered for the search category relevant to the reserved word information and the character string information except the reserved word information when the processor determines that the reserved word information is included in the character string information, and
wherein the web page display controller displays the web page, relevant to the second URL or the third URL created by the URL creator, on the display.

* * * * *